(12) United States Patent
Liao

(10) Patent No.: US 7,431,491 B2
(45) Date of Patent: Oct. 7, 2008

(54) LIGHT GUIDE PLATE AND BACKLIGHT MODULE USING THE SAME

(75) Inventor: Ming-Yi Liao, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 139 days.

(21) Appl. No.: 11/309,511

(22) Filed: Aug. 15, 2006

(65) Prior Publication Data

US 2007/0223251 A1    Sep. 27, 2007

(30) Foreign Application Priority Data

Mar. 25, 2006  (CN) .................. 2006 1 0034743

(51) Int. Cl.
  *F21V 7/04*  (2006.01)
  *G02B 6/26*  (2006.01)
(52) U.S. Cl. .............. 362/620; 362/337; 362/339; 385/146
(58) Field of Classification Search ........... 362/617, 362/619, 620, 337, 339; 385/146
  See application file for complete search history.

(56) References Cited

U.S. PATENT DOCUMENTS 5,854,872 A * 12/1998 Tai .................. 385/133
5,999,685 A * 12/1999 Goto et al. .................. 385/146
6,290,364 B1 * 9/2001 Koike et al. ................. 362/620
6,752,505 B2   6/2004 Parker et al.
7,206,491 B2 * 4/2007 Feng et al. .................. 385/146
7,232,250 B2 * 6/2007 Chuang ..................... 362/620

* cited by examiner

Primary Examiner—Sandra O'Shea
Assistant Examiner—James W Cranson

(57) ABSTRACT

A light guide plate includes a light input surface and a light output surface adjoining the light input surface. The light output surface defines a first portion adjacent to the light input surface, a second portion connected with the first portion away from the light input surface. The light guide plate further includes a plurality of prism lenses arranged on the second portion, each prism lens extending along a direction perpendicular to the light input surface, and a plurality of tetrahedral lenses arranged on the first portion of the light output surface, each tetrahedral lens having a side surface located at an imaginary boundary line perpendicularly to the light output surface. A relative height of each tetrahedral lens progressively increases with increasing distance from the light input surface. The present light guide plate and a backlight module using the same can efficiently decrease interference.

20 Claims, 11 Drawing Sheets

LIGHT GUIDE PLATE AND BACKLIGHT MODULE USING THE SAME

FIELD OF THE INVENTION

The present invention relates to light guide plates and backlight modules, particularly, to an edge-lighting type light guide plate and backlight module for use in, for example, a liquid crystal display (LCD).

DISCUSSION OF THE RELATED ART

In a liquid crystal display device, a liquid crystal is a substance that does not itself radiate light. Instead, the liquid crystal relies on light received from a light source, thereby displaying images and data. In the case of a typical liquid crystal display device, a backlight module powered by electricity supplies the needed light.

Generally, backlight modules can be classified into an edge lighting type or a bottom lighting type based upon the location of lamps within the device. A typical edge lighting type backlight module has a light source arranged at a side portion of a light guiding plate for guiding light. The light source can be selected from one of a light emitting diode and a cold cathode fluorescent lamp. The light guide plate includes a light input surface located at a side surface thereof, and a light output surface adjoining the light input surface. The light guide plate may further include a plurality of V-shaped prism lenses each extending out from the light output surface along a direction perpendicular to the light input surface. The V-shaped prism lenses can condense light to emit out at a relatively small light emitting angle, so as to increase the backlight module's optical brightness.

However, interference lines, such as a plurality of dark or brightness lines, are generally unavoidably formed on the light output surface adjacent the light input surface because the V-shaped prism lenses are aligned on the light output surface regularly and periodically, and especially since each longitudinal side of each V-shaped prism lens extends along a same direction.

What is needed, therefore, is a light guide plate and a backlight module using the same that overcomes the above mentioned disadvantages.

SUMMARY

A light guide plate according to a preferred embodiment includes a light input surface and a light output surface adjoining the light input surface. The light output surface defines a first portion adjacent to the light input surface, a second portion connected with the first portion at a distance from the light input surface, and an imaginary boundary line between the first portion and the second portion. The light guide plate further includes a plurality of prism lenses arranged on the second portion of the light output surface, each prism lens extending along a direction perpendicular to the light input surface. The light guide plate further includes a plurality of elongated tetrahedral lenses arranged on the first portion of the light output surface, each tetrahedral lens having a side surface located at the imaginary boundary line perpendicularly to the light output surface. A relative height of each tetrahedral lens progressively increases with increasing distance from the light input surface.

A backlight module according to another embodiment includes a light source and a light guide plate. The same light guide plate as described in the previous paragraph is employed in this embodiment. The light source is positioned adjacent to a light input surface of the light guide plate.

Other advantages and novel features will become more apparent from the following detailed description of the preferred embodiments, when taken in conjunction with the accompanying drawings.

BRIEF DESCRIPTION OF THE DRAWINGS

Many aspects of the light guide plate and related backlight module having the same can be better understood with reference to the following drawings. The components in the drawings are not necessarily drawn to scale, the emphasis instead being placed upon clearly illustrating the principles of the present devices. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present light guide plate and backlight module using the same, in detail.

Figure 1:
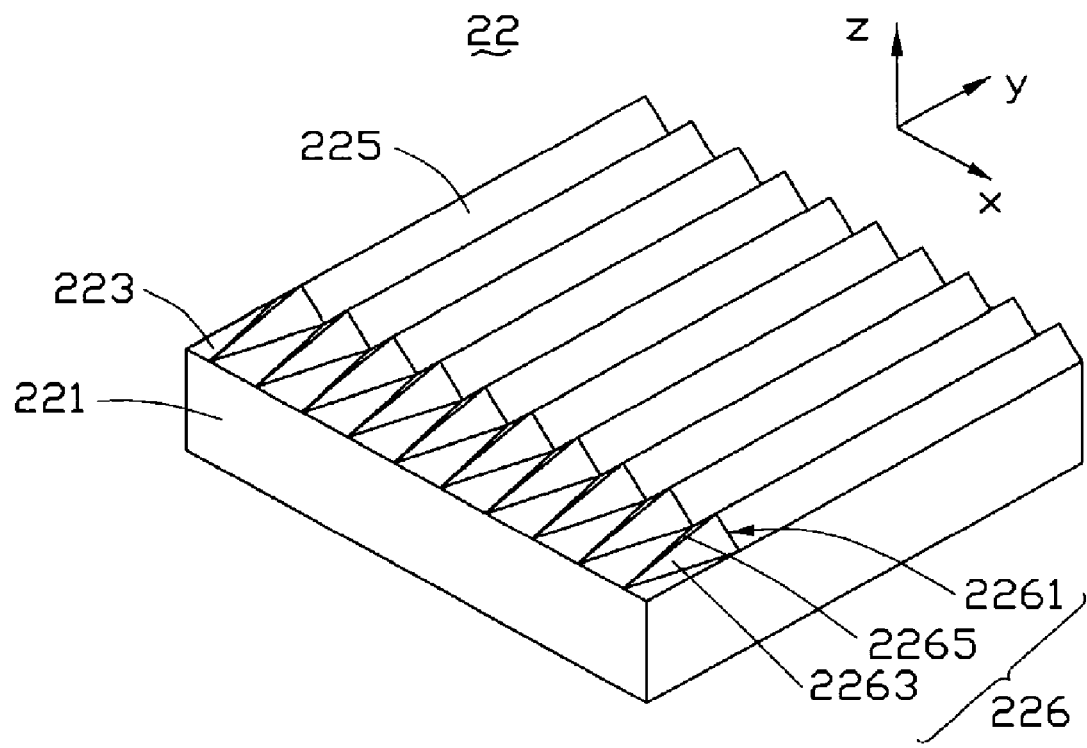
FIG. 1 is a schematic, isometric view of a light guide plate according to a first preferred embodiment.
Figure 2:
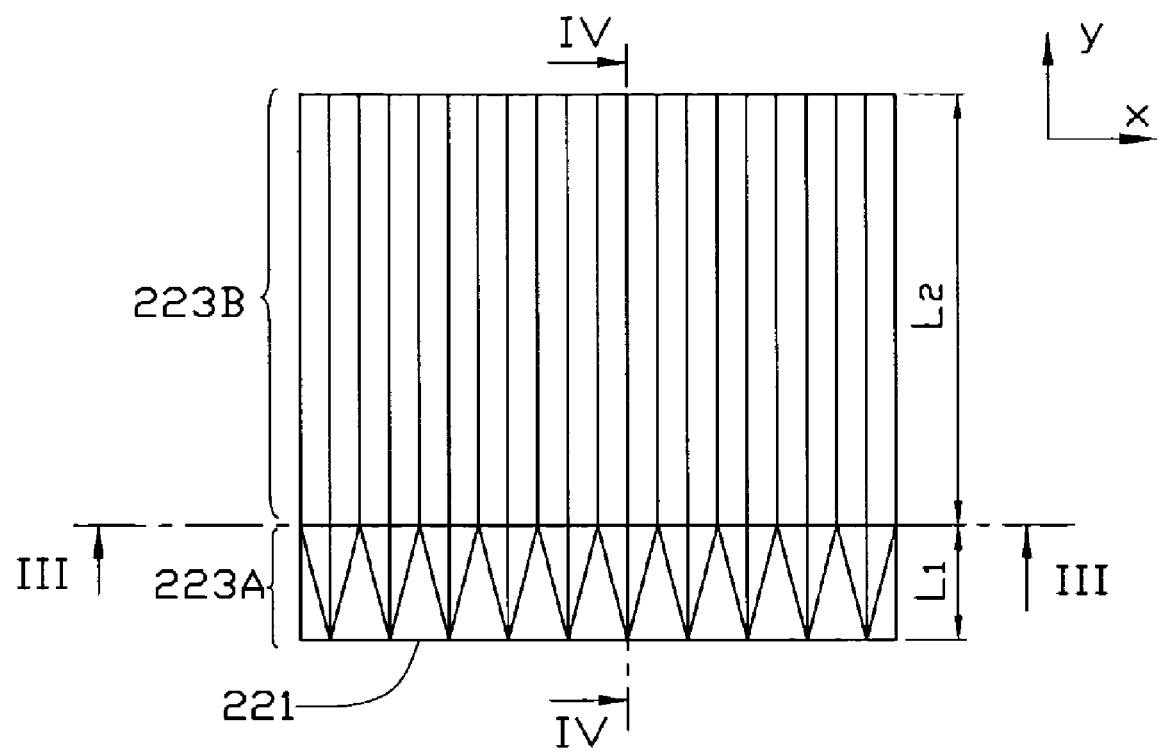
FIG. 2 is a top plan view of the light guide plate of FIG. 1.

Referring to FIGS. 1 and 2, a light guide plate 22 in accordance with a first preferred embodiment is shown. The light guide plate 22 is a rectangular sheet, or alternatively may be generally cuneiform. In the illustrated embodiment, the light guide plate 22 is a rectangular sheet. The light guide plate 22 includes a light input surface 221 and a light output surface 223 adjoining the light input surface 221. The light output surface 223 defines a first portion 223A adjacent to the light input surface 221, a second portion 223B connected with the first portion 223A at a distance from the light input surface 221, and an imaginary boundary line III-III between the first portion 223A and the second portion 223B parallel to the light input surface 221. The light guide plate 22 further includes a plurality of elongated prism lenses 225 formed on the second portion 223B of the light output surface 223, each lateral edge of elongated prism lens 225 extending along a direction perpendicular to the light input surface 221 (a Y-axis direction shown in FIG. 2). The light guide plate 22 further includes a plurality of elongated tetrahedral lenses 226 arranged on the first portion 223A of the light output surface 223 regularly and periodically.

Referring also to FIG. 2, a length $L_1$ represents a distance of the first portion 223A along the direction perpendicular to the light input surface 221. A length $L_2$ represents a distance of the second portion 223B along the direction perpendicular to the light input surface 221. The length $L_1$ is defined according to a largest size of interference area that is planed to be decreased. Generally, the length $L_1$ is larger than the length $L_2$.

Figure 3:
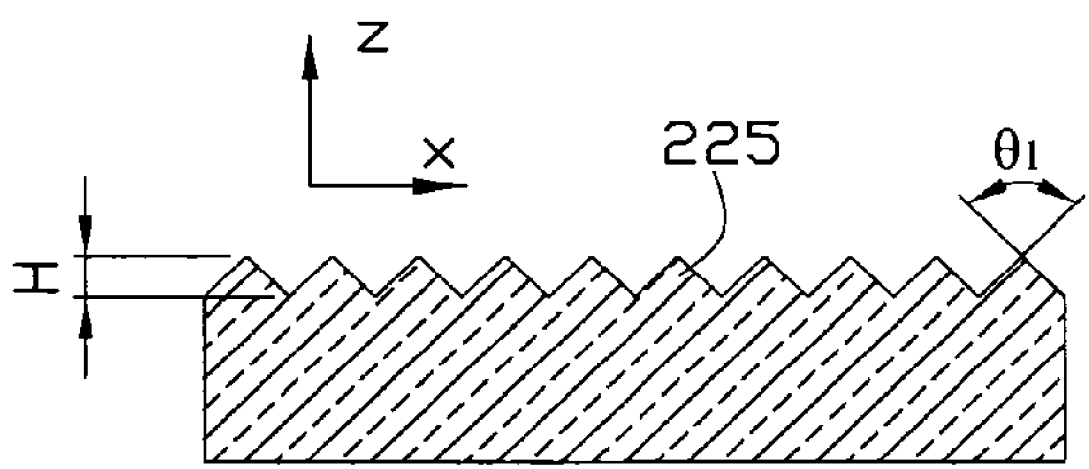
FIG. 3 is a schematic, cross-sectional view taken along a III-III line of FIG. 2.

The elongated prism lenses 225 are configured to be V-shaped protrusions aligned side by side on the second portion 223B of the light output surface 223 covering the total second portion 223B of the light output surface 223. Referring to FIG. 3, each of the V-shaped protrusions has a triangular cross-section on a plane taken along the line III-III. A vertex angle θ1 of each triangular cross-section may be configured to be equal to and smaller than about 175 degrees. A length of a bottom edge (not labeled) of each triangular cross-section may be configured to be equal to and smaller than about 2.0 millimeters. A height H of each triangular cross-section of each prism lens 225 may also be configured to be equal to and smaller than about 2.0 millimeters.

Referring also to FIG. 1, the elongated tetrahedral lenses 226 are aligned side by side corresponding to the elongated prism lenses 225 along a direction parallel to the light input surface. Each elongated tetrahedral lens 226 includes a first side surface 2261, a second side surface 2263, a third side surface 2265, and a bottom surface (not labeled) defined by the light output surface 223. The first side surface 2261 is located on the imaginary boundary line III-III perpendicularly to the light output surface 223. In the illustrated embodiment, the first side surfaces 2261 of the elongated tetrahedral lenses 226 and ends of the elongated prism lenses 225 at the imaginary boundary line III-III are interconnecting, each elongated tetrahedral lens 226 connecting with each prism lens 225 respectively. Accordingly, a vertex angle of each first side surface 2261 may be configured to be equal to and smaller than about 175 degrees. A length of a bottom edge of each first side surface 2261 may be configured to be equal to and smaller than about 2.0 millimeters. A height H of each first side surface 2261 may also be configured to be equal to and smaller than about 2.0 millimeters.

Figure 4:
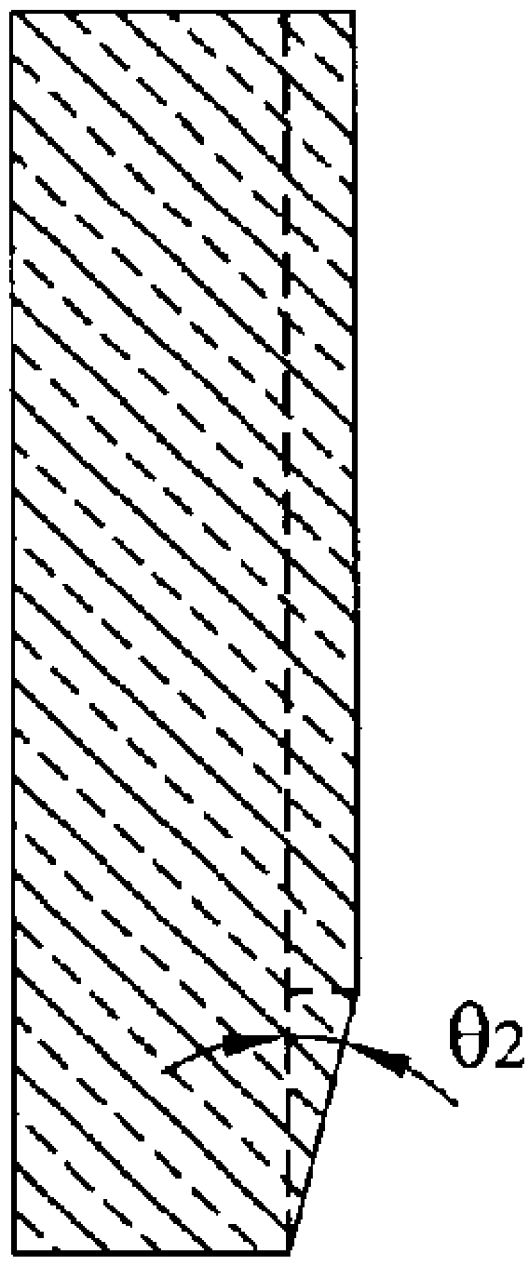
FIG. 4 is a schematic, cross-sectional view taken along a IV-IV line of FIG. 2.

Referring to FIG. 4, a ridge (not labeled) defined by the second side surface 2262 and the third side surface 2263 has a projecting angle θ2, and an intersecting point (not labeled) relative to the light output surface 223. The projecting angle θ2 is configured to be equal to and smaller than about 85 degrees. The ridge is slanted to the light output surface 223 and points to the light input surface 221. Accordingly, it can be concluded that a relative height of each elongated tetrahedral lens 226 progressively increases with increasing distance from the light input surface 221. In this embodiment, the intersecting point is located at the light input surface 221.

It is noted that, in an exemplary embodiment, the elongated tetrahedral lenses 226 and the corresponding elongated prism lenses 225 may be configured to be staggered regularly for a certain distance. In addition, the first side surface 2261 of each triangular lens 226 may be different from the triangular cross-section taken along the line III-III of the prism lens 225. For example, a bottom edge of the first side surface 2261 and a vertex angle of the first side surface 2261 of the elongated tetrahedral lens 226 may be configured to be both smaller than those of the triangular cross-section of the prism lens 225.

The light guide plate 22 may be integrally manufactured by injection molding or other suitable technology. A material of the light guide plate 22 is selected from a group comprising of polymethyl methacrylate (PMMA), polycarbonate (PC), and other suitable transparent resin materials.

In use, light rays are projected from a light source (not shown) to the light input surface 221 of the light guide plate 22. The light guide plate 22 redirects the light rays, which then emits the light rays redirected at the output surface of the light guide plate 22. Some light rays are reflected and refracted at each elongated tetrahedral lens 226 of the first portion 223A along the second side surface 2263 and the third side surface 2265. In addition, the height of each elongated tetrahedral lens 226 progressively increases with increasing distance from the light input surface 221, thereby interference lines occurrences can be decreased on the light output surface 223 adjacent the light input surface 221. Therefore, the present light guide plate not only can improve the optical brightness, but also can efficiently decrease interference.

Figure 5:
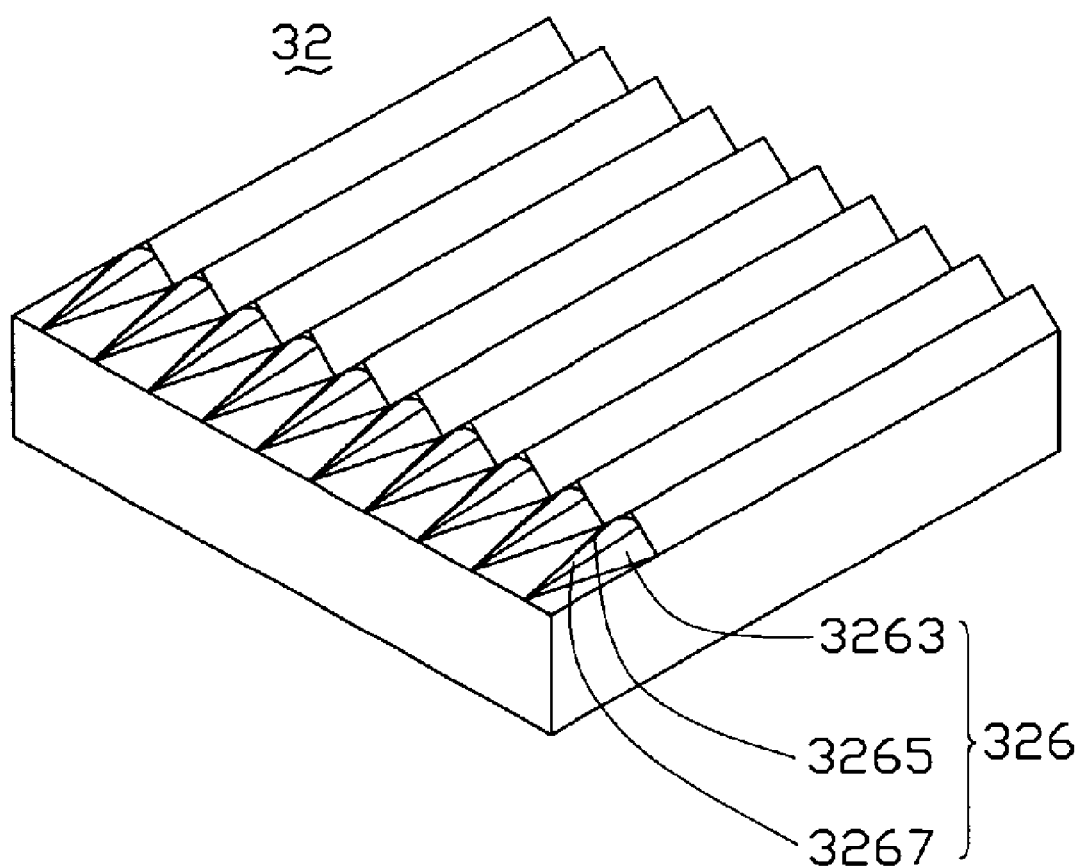
FIG. 5 is a schematic, isometric view of a light guide plate according to a second preferred embodiment.

Referring to FIG. 5, a light guide plate 32, in accordance with a second preferred embodiment, is similar in principle to the light guide plate 22, except that a ridge defined by a second side surface 3263 and the third side surface 3265 of each elongated tetrahedral lens 326 are curved to form a conical surface 3267. A conical angle (not labeled) of each conical surface 3267 is configured to be equal to and smaller than 2.0 millimeters.

Figure 6:
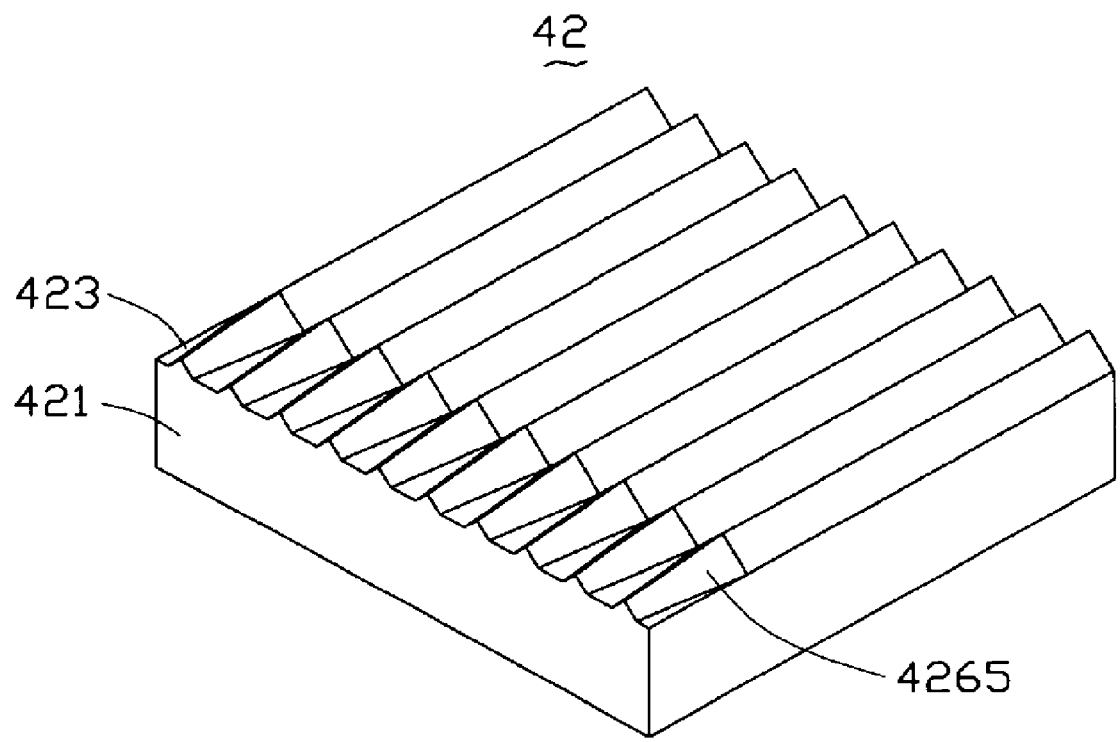
FIG. 6 is a schematic, isometric view of a light guide plate according to a third preferred embodiment.
Figure 7:
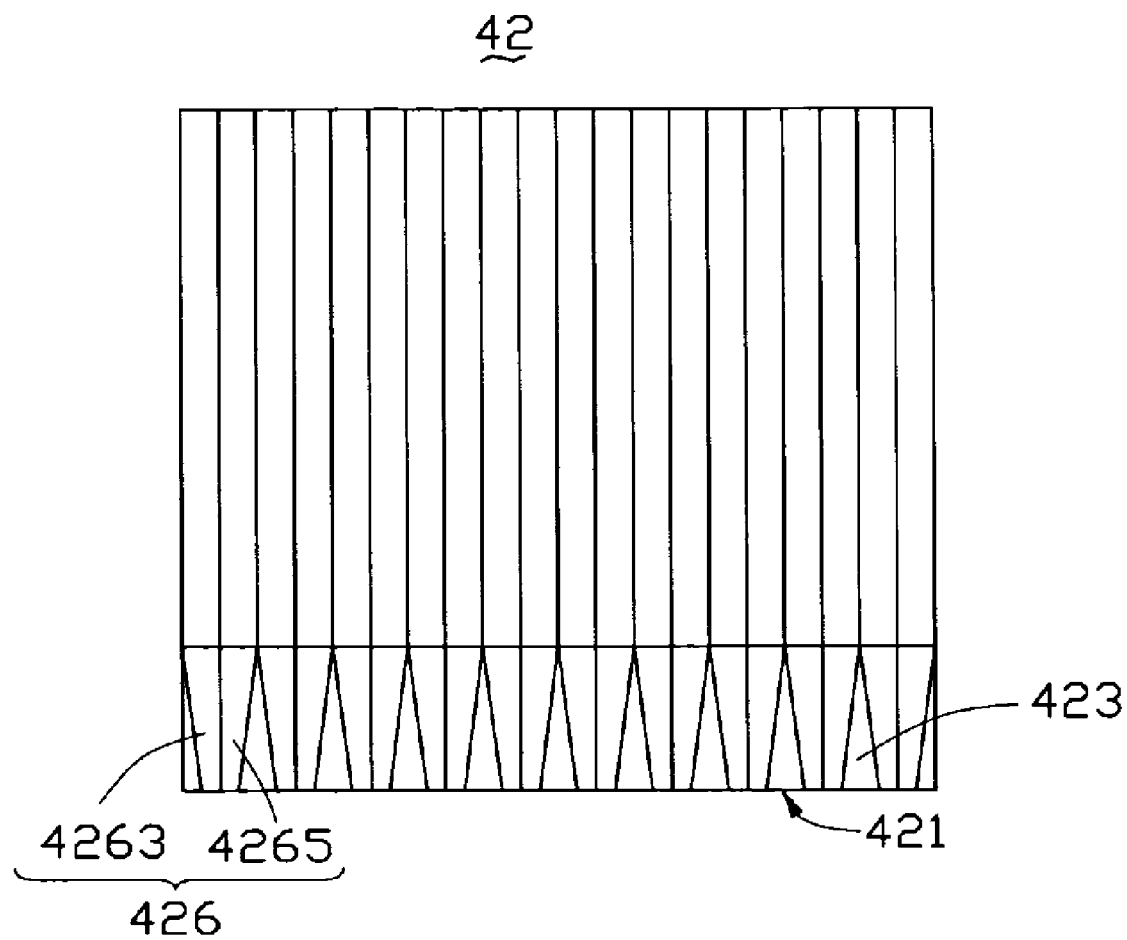
FIG. 7 is a top plan view of the light guide plate of FIG. 6.

Referring to FIGS. 6 and 7, a light guide plate 42, in accordance with a third preferred embodiment, is similar in principle to the light guide plate 22 of the first preferred embodiment, except that a corner of each elongated tetrahedral lens 426 adjacent a light input surface 421 have been cut out. It is also said that a ridge (not labeled) defined by a second side surface 4263 and a third side surface 4265 intersects with a plane defined by a light output surface 423 at an outer area of the light input surface 421.

Figure 8:
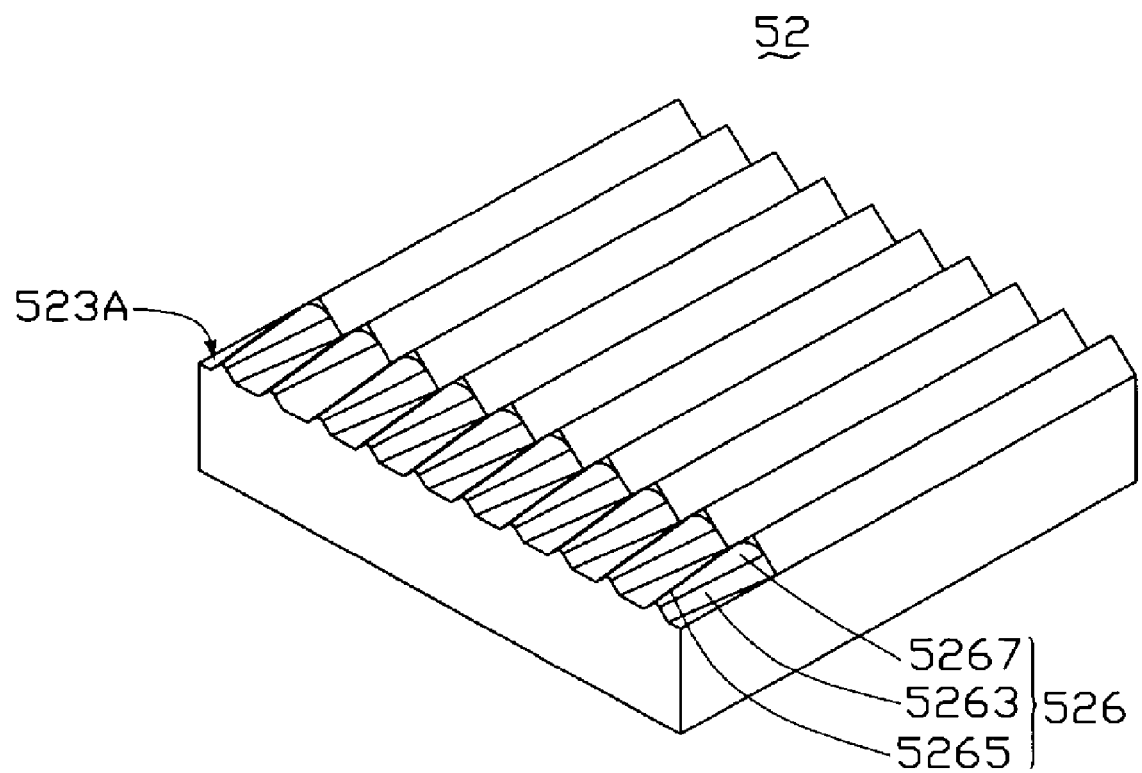
FIG. 8 a schematic, isometric view of a light guide plate according to a fourth preferred embodiment.

Referring to FIG. 8, a light guide plate 52, in accordance with a fourth preferred embodiment, is similar in principle to the light guide plate 42 of the third preferred embodiment, except that a ridge defined by a second side surface 5263 and the third side surface 5265 of each elongated tetrahedral lens 526 are curved to form a conical surface 5267. A conical angle (not labeled) of each conical surface 5267 is configured to be equal to and smaller than 2.0 millimeters.

Figure 9:
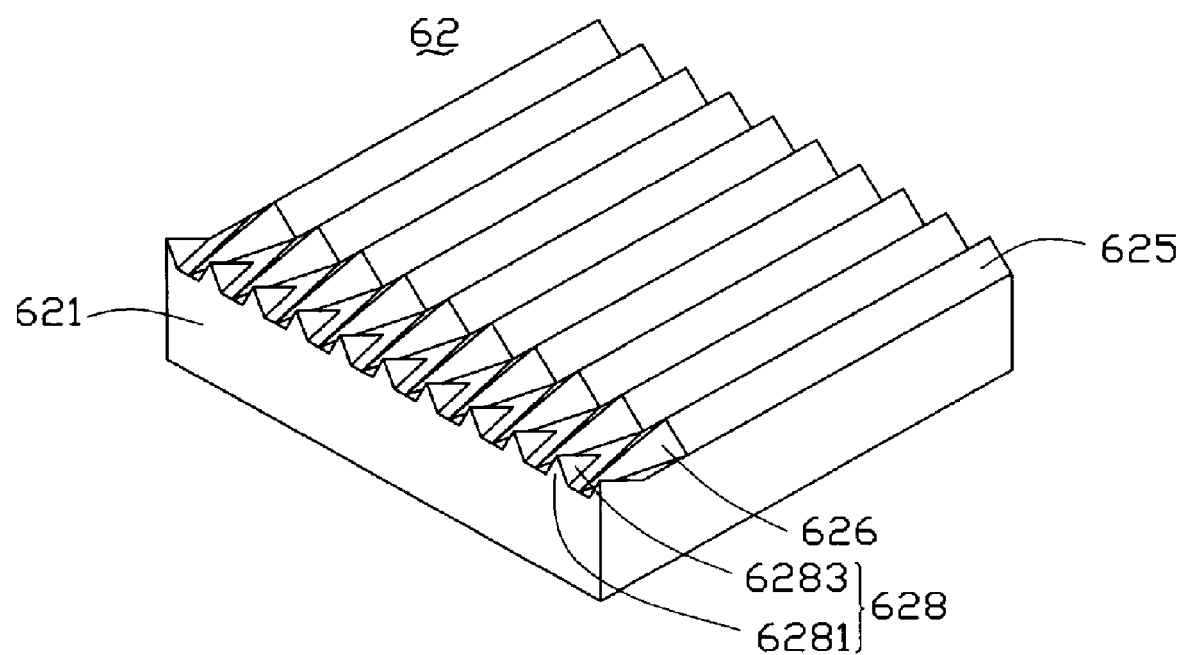
FIG. 9 is schematic, isometric view of a light guide plate according to a fifth preferred embodiment.
Figure 10:
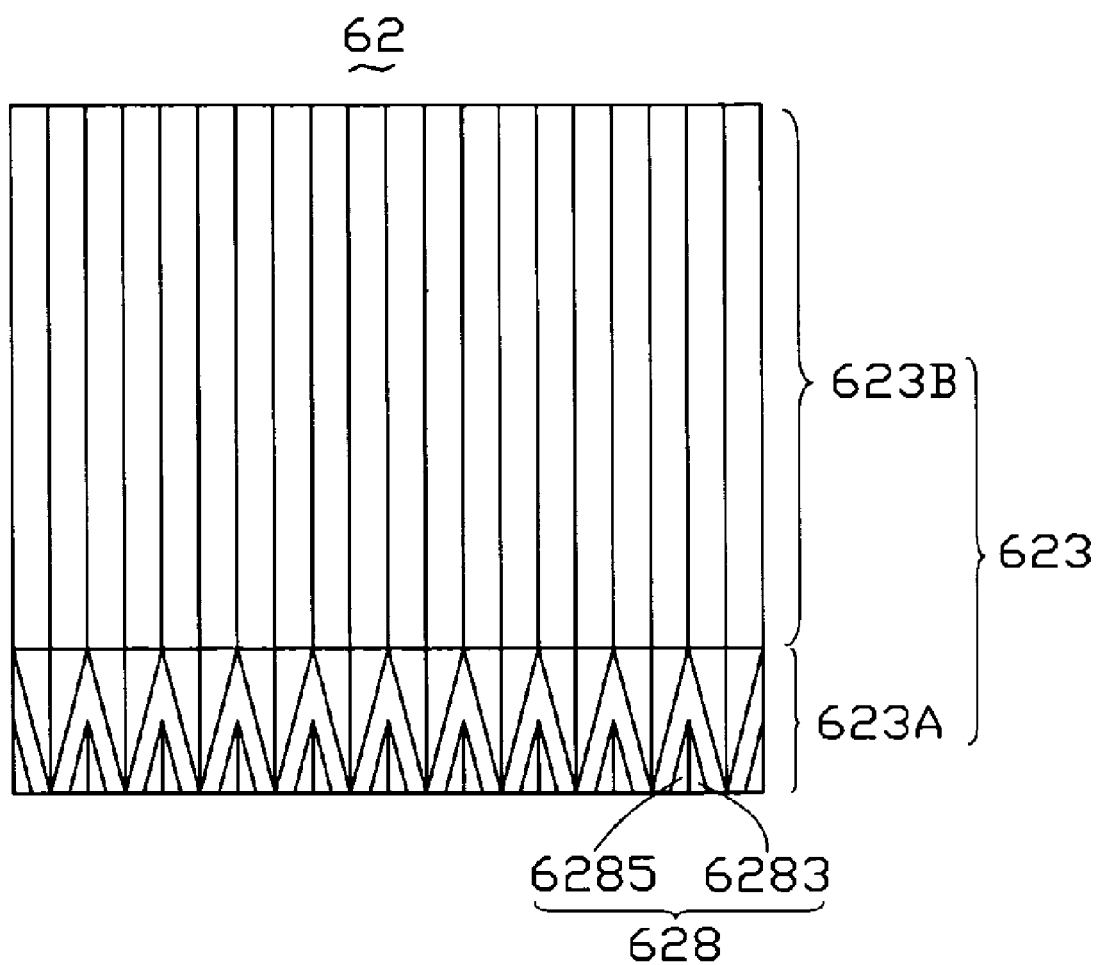
FIG. 10 is a top plan view of the light guide plate of FIG. 9.

Referring to FIGS. 9 and 10, a light guide plate 62, in accordance with a fifth preferred embodiment, is similar in principle to the light guide plate 22, except that the light guide plate 62 further includes a plurality of counter tetrahedral lenses 628 configured for further decreasing interference efficiently. The light guide plate 62 includes a light input surface 621, a light output surface 623 defining a first portion 623A and a second portion 623B, a plurality of prism lenses 625 and elongated tetrahedral lenses 626. The counter tetrahedral lenses 628 are aligned side by side on the first portion 623A and interlaced with the corresponding elongated tetrahedral lenses 626 regularly.

Each counter tetrahedral lens 628 includes a first side surface 2281, a second side surface 2283, a third side surface 2285, and a bottom surface (not labeled) defined by the light output surface 623. The first side surface 6281 is located at a plane defined by the light input surface 621. A ridge (not labeled) defined by the second side surface 6283 and the third side surface 6285 of each counter tetrahedral lens 628 is slanted to the light output surface 623 and points to the second portion 623B. The counter tetrahedral lenses 628 may be configured to be similar to the elongated tetrahedral lenses 626, except that a relative height of the counter tetrahedral lenses 328 progressively decreases with increasing distance from the light input surface 621.

Figure 11:
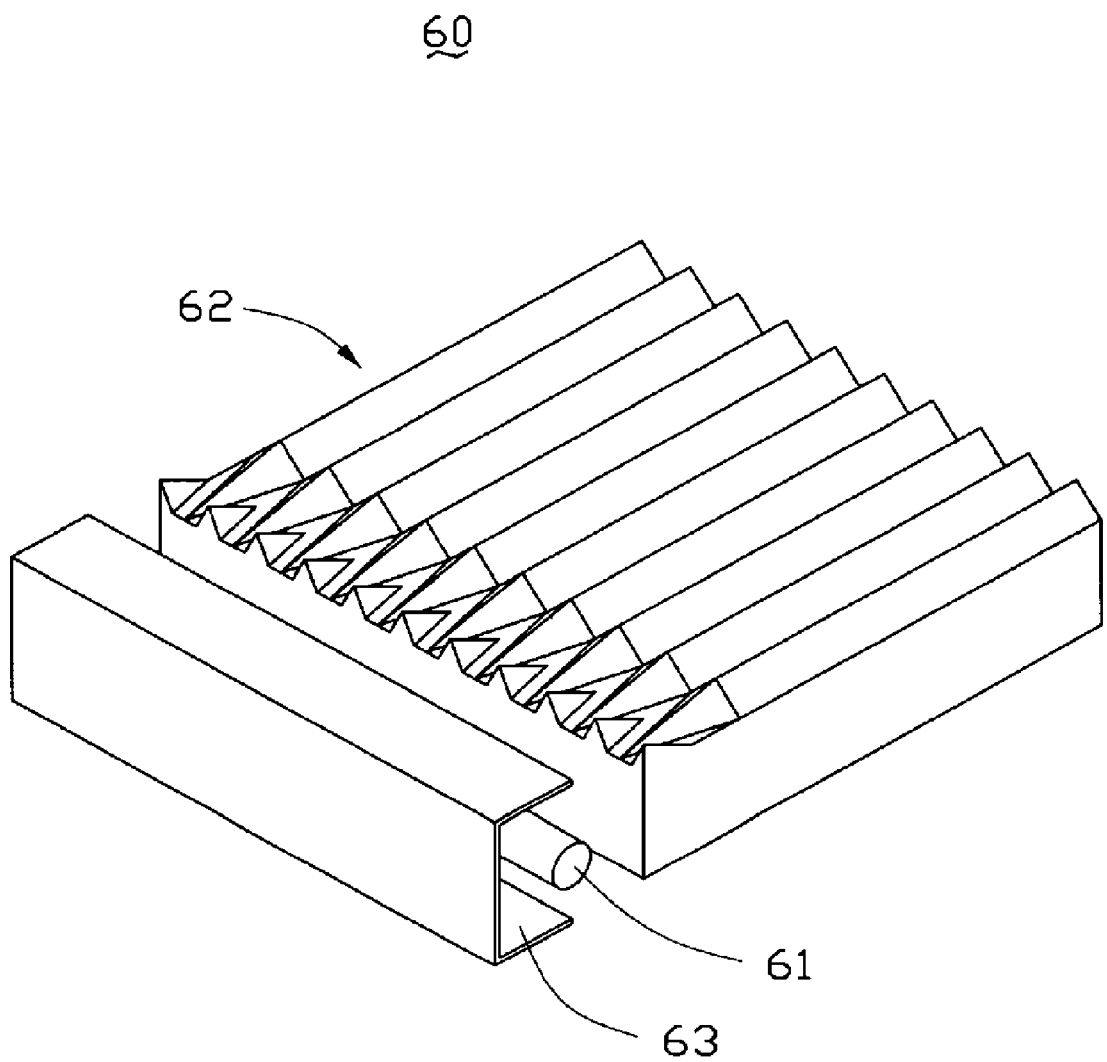
FIG. 11 is a schematic, isometric view of a backlight module according to a preferred embodiment.

Referring to FIG. 11, a backlight module 60 in accordance with a preferred embodiment is shown. The backlight module 60 includes a cold cathode fluorescent lamp 61, the light guide plate 62 and a reflector 63. The same light guide plate 62 as described in previous paragraphs is provided. The cold cathode fluorescent lamp 61 is positioned adjacent the light input surface 621 of the light guide plate 62. The reflector 63 partly surrounds the cold cathode fluorescent lamp 61 away from the light guide plate 62, configured for improving light energy utilization rate. It is to be understood that the reflector 63 can be selected from any conventional reflectors. It is noted that a plurality of light emitting diodes may be employed as light sources to replace the cold cathode fluorescent lamp 61 in this embodiment.

It is to be understood that the present light guide plates described in above preferred embodiments may be assembled to form a backlight module with at least a light source.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A light guide plate, comprising:
   a light input surface;
   a light output surface adjoining the light input surface, the light output surface defining a first portion adjacent to the light input surface, a second portion connected with the first portion at a distance from the light input surface, and an imaginary boundary line between the first portion and the second portion;
   a plurality of prism lenses arranged on the second portion of the light output surface, each prism lens extending along a direction perpendicular to the light input surface; and
   a plurality of elongated tetrahedral lenses arranged on the first portion of the light output surface, each tetrahedral lens having a first side surface located at the imaginary boundary line perpendicularly to the light output surface, and a relative height of each tetrahedral lens progressively increasing with increasing distance from the light input surface.

2. The light guide plate according to claim 1, wherein the imaginary boundary line parallels to the light input surface.

3. The light guide plate according to claim 1, wherein the prism lenses are V-shaped protrusions aligned side by side on the second portion of the light output surface, along a direction perpendicular to the light input surface.

4. The light guide plate according to claim 3, wherein each of the V-shaped protrusions has a triangular cross-section taken along the imaginary boundary line, a vertex angle of each triangular cross-section being in a range from equal to and smaller than 175 degrees, and a length of a bottom edge of each triangular cross-section being in a range from equal to and smaller than about 2.0 millimeters.

5. The light guide plate according to claim 1, wherein the tetrahedral lenses are aligned side by side along a direction parallel to the light input surface.

6. The light guide plate according to claim 5, wherein the first side surface of each elongated tetrahedral lens has a bottom edge and a vertex angle, the vertex angle being configured to be equal to and smaller than about 175 degrees, the bottom edge being configured to be equal to and smaller than about 2.0 millimeters.

7. The light guide plate according to claim 5, wherein each tetrahedral lens comprises a second side surface and a third side surface connecting with the first side surface respectively, a ridge defined by the second side surface and the third side surface having a projecting angle, and an intersecting point relative to the light output surface.

8. The light guide plate according to claim 7, wherein the projecting angle is configured to be equal to and smaller than about 85 degrees.

9. The light guide plate according to claim 7, wherein the intersecting point may be located at one of the light input surface and an outer area of the light input surface.

10. The light guide plate according to claim 7, wherein the ridge defined by a second side surface and the third side surface of each tetrahedral lens are curved to form a conical surface.

11. The light guide plate according to claim 10, wherein a conical angle of the conical surface is configured to be equal to and smaller than 2.0 millimeters.

12. The light guide plate according to claim 1, wherein the tetrahedral lenses connecting with the prism lenses correspondingly.

13. The light guide plate according to claim 1, wherein the tetrahedral lenses and the corresponding prism lenses are staggered regularly for a certain distance.

14. The light guide plate according to claim 1, further comprising a plurality of counter tetrahedral lenses aligned side by side on the first portion and interlaced with the corresponding elongated tetrahedral lenses regularly, a relative height of the counter tetrahedral lenses progressively decreasing with increasing distance from the light input surface.

15. The light guide plate according to claim 14, wherein each counter tetrahedral lens includes a first side surface, a second side surface and a third side surface the first side surface being located at a plane defined by the light input surface.

16. The light guide plate according to claim 15, wherein a ridge defined by the second side surface and the third side surface of each counter tetrahedral lens is slanted to the light output surface and points to the second portion.

17. A backlight module comprising:
    a light source, and
    a light guide plate having
    a light input surface, the light source disposed adjacent to the light input surface;
    a light output surface adjoining the light input surface, the light output surface defining a first portion adjacent to the light input surface, a second portion connected with the first portion at a distance from the light input surface, and an imaginary boundary line between the first portion and the second portion;
    a plurality of prism lenses arranged on the second portion of the light output surface, each prism lens extending along a direction perpendicular to the light input surface; and
    a plurality of elongated tetrahedral lenses arranged on the first portion of the light output surface, each tetrahedral lens having a side surface located at the imaginary boundary line perpendicularly to the light output surface, and a relative height of each tetrahedral lens progressively increasing with increasing distance from the light input surface.

18. The backlight module according to claim 17, further comprising a reflector partly surrounding the light source away from the light guide plate for improving light energy utilization rate.

19. A light guide plate comprising:
    a light input surface;
    a light output surface oriented perpendicular to the light input surface, the light output surface having a first surface portion adjacent the light input surface; and a plurality of spaced first protrusions formed on the first surface portion, the first protrusions being distributed on the first surface portion along a first direction parallel to the light input surface, each of the first protrusions extending along a second direction perpendicular to the light input surface, wherein a cross section, taken along a plane parallel to the light input surface, of each of the first protrusions increases with increasing distance from the light input surface.

20. The light guide plate of claim 19, wherein the light output surface has a second surface portion connected with the first surface portion, a plurality of second protrusions is formed on the second surface portion, and each second protrusion aligns with a corresponding one of the first protrusions in the second direction.

* * * * *